Figure 3:
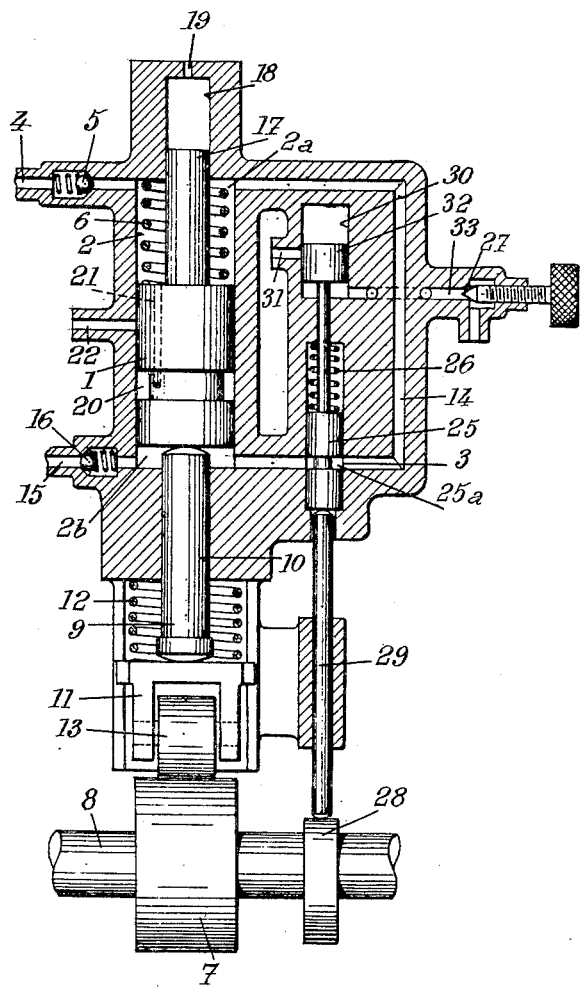

Jan. 1, 1963
P. E. BESSIERE
3,071,074
SELF-REGULATING PISTON PUMPS AND IN
PARTICULAR FUEL INJECTION PUMPS
Filed Jan. 26, 1959
2 Sheets-Sheet 1
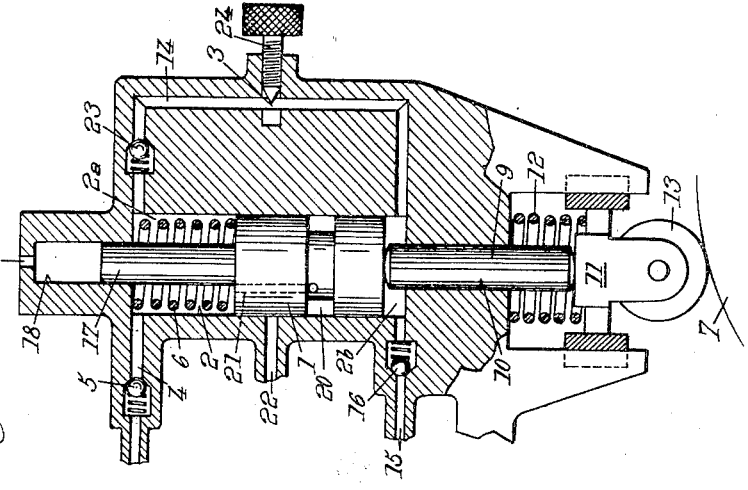
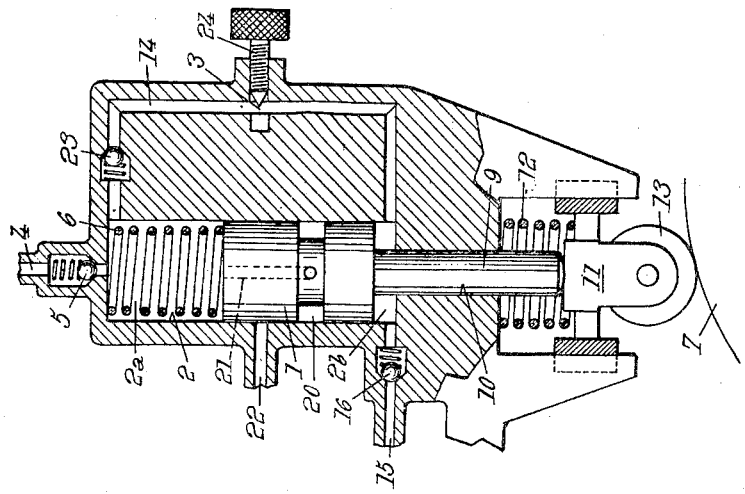
INVENTOR
Pierre Etienne Bessiere
BY
Bailey, Stephens + Huettig
ATTORNEYS

United States Patent Office 3,071,074
Patented Jan. 1, 1963

3,071,074
SELF-REGULATING PISTON PUMPS AND IN
PARTICULAR FUEL INJECTION PUMPS
Pierre Etienne Bessiere, 55 Blvd. Commandant Charcot,
Neuilly-sur-Seine, France
Filed Jan. 26, 1959, Ser. No. 788,816
Claims priority, application France Jan. 28, 1958
7 Claims. (Cl. 103—41)

The present invention relates to self-regulating piston pumps and in particular fuel injection pumps for internal combustion engines (this term designating all kinds of engines, including diesel engines). The pumps with which the present invention is concerned include a piston dividing the cylinder in which it reciprocates into a pressure chamber and a regulation chamber, this piston being actuated mechanically during its delivery stroke, that is to say in the direction which causes the volume of the pressure chamber to be reduced, and being moved in the opposed direction, during its return stroke, by suitable resilient means, the pressure chamber being provided with a feed conduit opening thereinto and with a delivery conduit for the outflow of the liquid supplied by the pump and the regulation chamber being provided with a liquid inlet conduit and with an outlet conduit including means for braking and/or temporarily stopping the flow of liquid passing therethrough in such manner that, when the speed at which the pump is driven exceeds a predetermined value, every return stroke and consequently the next delivery stroke of the piston are shortened and the volume of liquid delivered on every cycle of the pump through the delivery conduit decreases.

The object of this invention is to provide a pump of this kind which is better adapted to meet the requirements of practice than those known up to this time.

The pump according to my invention is characterized by the fact that the outlet conduit starting from the regulation chamber constitutes the feed conduit leading to the pressure chamber and is provided with means for preventing back flow of liquid from the pressure chamber during the delivery strokes of the piston, the inlet conduit of the regulation chamber being connected with a source of the liquid to be delivered by the pump.

Preferred embodiments of the present invention will be hereinafter described with reference to the accompanying drawings, given merely by way of example and in which:

FIGS. 1, 2 and 3 are diagrammatic sectional views of pumps made according to three different embodiments of the invention.

The pumps shown by the drawings are fuel injection pumps to be used for instance in connection with diesel engines.

Piston 1 is adapted to reciprocate in a cylinder 2 so as to divide it into two chambers, respectively a pressure chamber $2_a$ and a regulation chamber $2_b$. This piston is subjected on the one hand to the action of mechanical means for moving it positively in the direction which reduces the volume of pressure chamber $2_a$ (delivery stroke, in the upward direction) and on the other hand to the action of return means for moving the piston in the opposed direction (return stroke, in the downward direction) under the effect of suitable resilient means. During its upward stroke, the piston delivers fuel from pressure chamber $2_a$ and, during the return stroke, the piston drives the liquid present in regulation chamber $2_b$ through a passage 3 of relatively small section capable of braking or delaying the return movement of the piston.

The pressure chamber $2_a$ is connected with the injector or injectors of the engine to be supplied with fuel by the pump through a delivery conduit 4 provided with a check-valve 5. The means producing the return strokes of the piston are constituted by a spring 6 housed in chamber $2_a$.

In the embodiments illustrated by the drawings, the mechanical means for producing the delivery strokes of the piston include a cam 7 mounted on a shaft 8 (FIG. 3) driven at a speed proportional to that of the engine. The piston carries rigid therewith a push-rod 9 guided in a cylindrical bore 10 starting from the bottom of chamber $2_b$ and this rod 9 cooperates with a sliding member 11 urged downwardly by a spring 12 and carrying a roller 13 in contact with the periphery of cam 7. In the arrangement of FIGS. 2 and 3, the push-rod 9, instead of being rigid with piston 1 as in FIG. 1, is separate therefrom and bears against the under face of said piston. Anyway, the play between push-piece 9 and bore 10 is sufficiently small (account being taken of the length of bore 10 and of the pressure in chamber $2_b$) to prevent any leakage of fluid through this bore.

Of course, the mechanical means above described are given merely by way of example and any other equivalent means may be used for the same purpose. For instance, sliding member 10 might be replaced by a bent lever pivoted about an axis located at the level of its bend and having one of its ends applied against cam 7 and the other against the end of push-rod 9.

Passage 3 is provided in a communication conduit 14 extending from chamber $2_b$ to chamber $2_a$ and acting as fuel feed conduit for said chamber $2_a$. As for chamber $2_b$, it is fed with fuel through a conduit 15 provided with a check-valve 16 and connected with a suitable source of fuel under pressure such as a low pressure auxiliary pump.

The diameter of piston 1 being the same at both of its ends, the volume displaced in chamber $2_a$ is greater than that displaced in chamber $2_b$ due to the presence in said last mentioned chamber of push-rod 9 (FIG. 1). Consequently, whatever be the length of the strokes of piston 1, chamber $2_a$ is always uncompletely filled with fuel. In order to remedy this drawback, it is advantageous to provide piston 1, on the side opposed to push-rod 9, with an extension 17 (FIGS. 2 and 3) of cylindrical shape having the same cross section as push-rod 9 and moving in a housing 18 which preferably opens to the outside through an aperture 19. Of course, part 17 is fitted in a housing 18 in such manner as to prevent any outward leakage of fluid from chamber $2_a$.

In order to limit the active portion of the delivery stroke of piston 1, this piston 1 is provided with a groove 20 communicating through a longitudinal conduit 21 with chamber $2_a$. This groove 20 cooperates with a discharge conduit 22 so as to communicate therewith before piston 1 reaches the end of its delivery stroke.

According to a first embodiment of this invention, the above mentioned passage 3 may be arranged so as to brake the return movement of piston 1, effected under the action of spring 6, without delaying the beginning of said return movement. For this purpose, passage 3 constitutes a throttled section of conduit 14 (FIGS. 1 and 2). As this throttled passage is permanently open, it is necessary to provide means for preventing the back flow of liquid through conduit 14 during the delivery stroke of the piston. Such means are constituted by check-valve 23.

As shown by FIGS. 1 and 2, throttled passage 3 may be limited by a screw 24 which, in the construction shown by the drawings, is adjusted manually. However, this screw might be automatically controlled as a function of the speed of the engine by a suitable governor such as a centrifugal governor or a hydraulic governor operative by a pressure varying with the speed of the engine.

The operation of a pump such as shown by FIGS. 1 and 2 is as follows.

Initially piston 1 is in the position shown by the drawings. Cam 7 causes piston 1 to move upwardly, through roller 13, sliding member 11 and push-rod 9. Piston 1 compresses spring 6 and causes the liquid contained in chamber $2_a$ to be delivered toward the injector or injectors of the engine through conduit 4, past check-valve 5 (check-valve 23 being closed by the effect of the pressure).

During this time, chamber $2_b$, the volume of which has been increasing, is filled with fuel flowing past check-valve 16. Injection stops when groove 20 opens discharge conduit 22 thus causing the pressure in chamber $2_a$ to drop, owing to the provision of conduit 21. Piston 1 still moves a short distance in the upward direction, groove 20 remaining in communication with conduit 22.

Then piston 1 stops and starts moving downwardly. At this time, fuel is transferred from chamber $2_b$ to chamber $2_a$ through conduit 14 which includes the throttled passage 3.

This throttled passage brakes the downward movement of piston 1 which takes place under the effect of spring 6 at a speed lower than that of sliding member 11. This member, at least for speeds of operation higher than a given value, reaches its lowermost position and starts moving back upwardly before piston 1 comes into contact with its lower abutment. Sliding member 11 therefore contacts push-rod 9 as it is moving downwardly, which stops the transfer of liquid through conduit 14 and marks the beginning of a new injection of fuel.

The higher the speed at which the pump is driven, the higher the level at which push-piece 9 is stopped during its downward stroke by sliding member 11 and the shorter the next delivery stroke of piston 1. Therefore, the pump has a self-regulating operation.

This regulation effect may be combined with that due to a variation of the cross sectional area of passage 3 which may be obtained, as above stated, by a governor responsive to variations of the speed of the engine.

According to a second embodiment illustrated by FIG. 3, passage 3 is arranged in such manner as to delay the beginning of the return movement of piston 1 with respect to the time when sliding member 11 ceases to act thereon through push-rod 9.

For this purpose, passage 3 is obtained by the cooperation with conduit 14 of the groove $25_a$ of a slide valve 25 actuated in one direction on every delivery stroke of piston 1 against the action of return means constituted for instance by a spring 26, the return movement of slide valve 25 under the action of said spring 26 being braked by the fact that said slide valve drives out liquid to the outside through a throttled passage 27.

To operate slide valve 25, shaft 8 carries a second cam 28 cooperating with a push-rod 29 in contact with slide valve 25. The liquid which serves to brake the return movement of slide valve 25 is introduced through a conduit 31 into a cylinder 30 under a piston 32 rigid with slide valves 25, this liquid being driven out by this piston through a conduit 33 including the above mentioned throttled passage 27.

The general operation of the pump of FIG. 3 is similar to that of the pumps of FIGS. 1 and 2. However, the beginning of the downward movement of piston 1 instead of taking place when sliding member 11 starts moving downwardly (as in the case of FIGS. 1 and 2) takes place only when the groove $25_a$ of slide valve 25 begins to open conduit 14.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:
1. A self-regulating liquid pump which comprises, in combination, a cylinder, a piston fitting slidably in said cylinder, said piston dividing said cylinder into two chambers, respectively a pressure chamber and a regulation chamber, a shaft, mechanical means driven by said shaft and directly connected with said piston for actuating said piston under the action of said shaft only in one direction to produce the delivery strokes of said piston, during which the volume of said pressure chamber is reduced, resilient means interposed between said piston and said cylinder for actuating said piston in the opposed direction independently of the action of said shaft to produce the return strokes of said piston, during which the volume of said regulation chamber is reduced, a delivery conduit leading out from said pressure chamber, a liquid inlet conduit opening into said regulation chamber, said inlet conduit being connected with a source of the liquid to be delivered by the pump, valve means in said inlet conduit permitting inflow of liquid into said regulation chamber only during the delivery strokes of said piston, a feed conduit starting from said regulation chamber and opening into said pressure chamber, means located at least partly in said feed conduit for delaying the flow of liquid therethrough from said regulation chamber to said pressure chamber, and valve means in said feed conduit arranged to prevent back flow of liquid through said feed conduit, in the direction leading from said pressure chamber to said regulation chamber, during the delivery strokes of said piston.

2. A pump according to claim 1 in which the means for delaying the flow of liquid through said feed conduit and the means for preventing back flow of liquid through said feed conduit during the delivery strokes of said piston both comprise a slide valve extending across said feed conduit so as to be able either to close or to open it, means, operatively connected with said mechanical means, for mechanically actuating said slide valve in one single direction to close it at the beginning of every delivery stroke of said piston and to keep it closed until the end of said stroke, resilient means operatively connected with said slide valve for actuating said slide valve in the opposed direction, and means operatively connected with said slide valve for braking the movements thereof in said last mentioned direction.

3. A pump according to claim 1 in which said means for delaying the flow of liquid through said feed conduit are means for throttling a portion of said last mentioned conduit.

4. A pump according to claim 1 in which said means for preventing back flow of liquid through said feed conduit during the delivery strokes of said piston consist of a valve mounted in said feed conduit and hydraulically connected with said pressure chamber to be closed during the delivery strokes of said piston.

5. A pump according to claim 1 in which said means for preventing back flow of liquid through said feed conduit during the delivery strokes of said piston consist of a check valve mounted in said feed conduit.

6. A pump according to claim 1 in which the means for delaying the flow of liquid through said feed conduit comprise a valve located in said feed conduit so as to be able either to close or to open it, means operatively connected with said mechanical means for having said last mentioned valve in feed conduit closing position at the end of every delivery stroke of said piston and means operatively connected with said last mentioned valve for bringing it into feed conduit opening position some time after the beginning of every return stroke of said piston.

7. A pump according to claim 1 in which the means for delaying the flow of liquid through said feed conduit comprise a valve located in said feed conduit so as to be able either to close or to open it, mechanical means operatively connected with said first mentioned mechanical means for acting in a single direction on said last mentioned valve to have it closed at the end of every delivery stroke of said piston while leaving said last mentioned valve free to open at the beginning of every return stroke of said piston, resilient means operatively connected with said last mentioned valve for urging it toward feed conduit opening position, and means operatively connected with said last mentioned valve for braking the movement thereof toward feed conduit opening position.

References Cited in the file of this patent

UNITED STATES PATENTS

| | | |
|---|---|---|
| 1,784,706 | Phillips | Dec. 9, 1930 |
| 2,066,673 | Dillstrom | Jan. 5, 1937 |
| 2,243,117 | Patterson | May 27, 1941 |
| 2,281,045 | Outin | Apr. 28, 1942 |
| 2,720,842 | Downing | Oct. 18, 1955 |
| 2,940,398 | Bessiere | June 14, 1960 |

FOREIGN PATENTS

| | | |
|---|---|---|
| 210,886 | Great Britain | Feb. 11, 1924 |
| 457,966 | Great Britain | Dec. 9, 1936 |